Nov. 14, 1939.     E. CLAXTON ET AL     2,179,542

INSULATED STRUCTURE AND METHOD OF MAKING THE SAME

Filed Oct. 26, 1933     2 Sheets-Sheet 1

Inventor
Edmund Claxton
Charles C. Schrader
Howard G. Swan.
by
Walter F Kaufman
Attorney Nov. 14, 1939.  E. CLAXTON ET AL  2,179,542
INSULATED STRUCTURE AND METHOD OF MAKING THE SAME
Filed Oct. 26, 1933  2 Sheets-Sheet 2
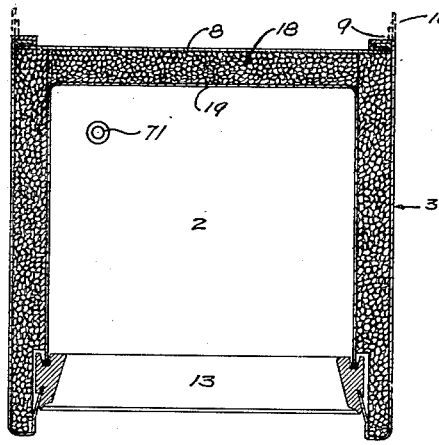
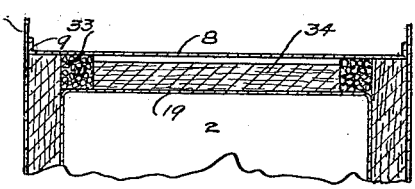
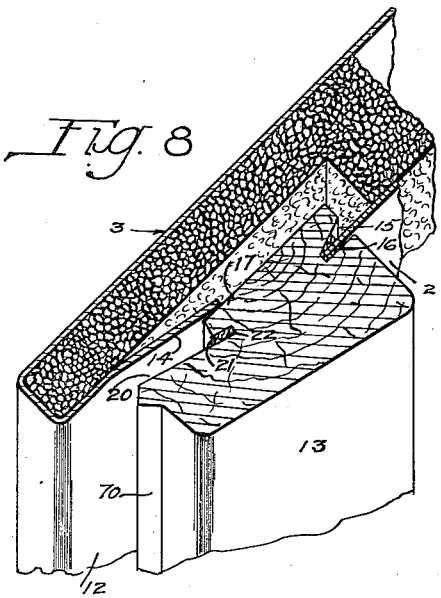
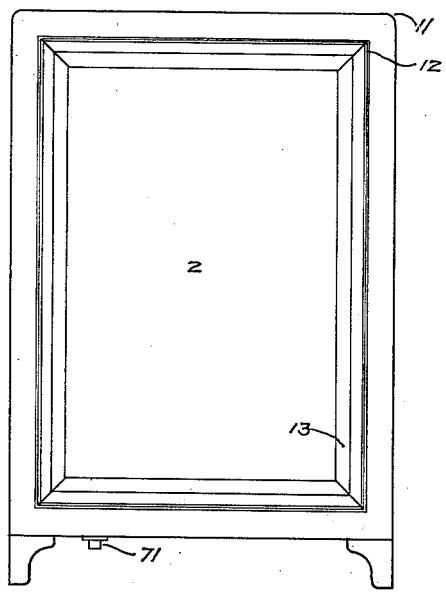
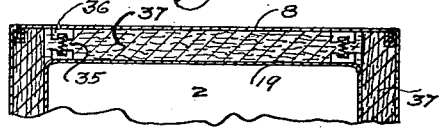

Patented Nov. 14, 1939

2,179,542

UNITED STATES PATENT OFFICE 2,179,542

INSULATED STRUCTURE AND METHOD OF MAKING THE SAME

Edmund Claxton, Charles C. Schrader, and Howard G. Swarr, Lancaster, Pa., assignors to Armstrong Cork Company, Lancaster, Pa., a corporation of Pennsylvania Application October 26, 1933, Serial No. 695,282

17 Claims. (Cl. 220—9)

Our invention relates to an insulated structure and method of constructing the same and more particularly to a refrigerator construction possessing light weight, rigidity and high insulating efficiency which is readily assembled and in which the insulation is sealed against the ingress of moisture-laden air.

In refrigerators, particularly those employing ice as the refrigerant, it is essential that the insulating material, which is spaced between the outer wall and the inner metallic crock, be protected against the deleterious effects of moisture. The same is true in the door construction of refrigerators; that is, the insulation should be kept dry at all times and should preferably be sealed within the insulation compartment. When air enters the insulation compartment of a refrigerator, it carries with it considerable moisture which, owing to the temperature differential between the inner and outer walls of the box is deposited by condensation and precipitation at the dew point within the insulation. It has been determined by tests that precipitation of moisture within the insulation equivalent to 1% of the weight of the insulation reduces the operating efficiency of the box approximately 5%. As the percentage of moisture increases, the insulating efficiency correspondingly decreases and a leaky box soon absorbs sufficient moisture to render the insulation of little or no value.

It has been proposed, therefore, to produce refrigerating cabinets in which the insulation is hermetically sealed within the insulation chamber. A construction, quite satisfactory from the standpoint of a sealed insulation compartment, has been developed in which the inner crock is made of metal and is secured to the outer shell by welding or soldering. An hermetically sealed insulation compartment results if the welding or soldering is carefully done. Heat is, however, readily transmitted by conduction from the exterior of the box to the refrigerating compartment since there is no effective barrier between the metallic crock and the outer shell.

The wood frame construction most commonly used at the present time in steel refrigerators is "leaky" and will absorb considerable moisture in a relatively short period. Under test conditions of 100° F. and 80% relative humidity, a wood frame construction ice box taken as a representative high grade box procured in the open market and containing 49 pounds of insulation material absorbed 9 pounds of water in a period of 18 weeks or 18.3% of the weight of the insulation. The rate of ice meltage increases proportionately with the increase in moisture content or decrease in insulating efficiency of the box.

Our invention contemplates a pair of spaced wall members, means biased to move said wall members with respect to each other, and a non-conducting strip cooperating with the wall members and limiting the relative movement between said wall members which the biased means normally urges.

In our preferred box construction we avail ourselves of the inherent resiliency of the insulation positioned between the crock and sheathing members to insure that tight joints are obtained between the breaker strip and the contacting metal. A portion at least of the insulation is compressed and its tendency to expand at the zone of compression urges the confining members away from each other. In our preferred embodiment, the crock is placed under compression and the expansion of the insulation is arrested by a breaker strip engaging the sheathing, whereby the tendency to further expansion places the sheathing under tension, and a rigid box is obtained without the use of wooden frame members and although a relatively light-weight of metal is used.

Our invention also contemplates a breaker strip with a sealing recess which is adapted to hold a sealing compound into which the metallic crock portion is urged, whereby an hermetic seal is obtained and an air tight insulation compartment results. In our preferred embodiment we use a breaker strip in the form of a closed frame and "snap" the strip in position upon compression of the insulation material.

Our invention is illustrated in the accompanying drawings, in which

Figure 6 is a sectional view of an ice refrigerator embodying our invention;

Figure 7 is a front elevation of an ice refrigerator, with the door removed;

Figure 8 is a detail, sectional view illustrating the method of "snap" assembly; and Figures 9 and 10 are sectional views showing modified constructions.

Figure 1:
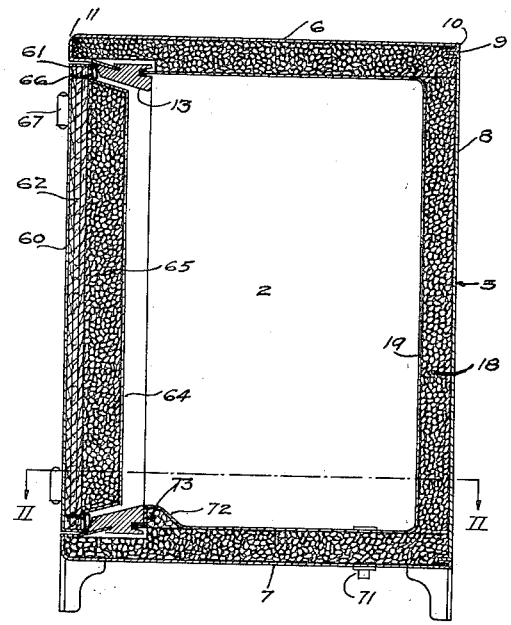
Figure 1 is a sectional view of an ice refrigerator embodying our invention and employing a "flush" type door.

In the drawings we have omitted the shelving, ice supporting tray and other fixtures for sake of clarity of illustration, since such accessories form no part of our invention.

Figure 2:
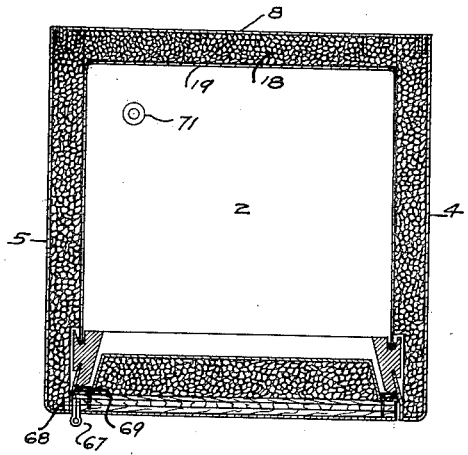
Figure 2 is a sectional view taken on the line II—II of Figure 1.

The preferred cabinet construction illustrated in Figures 1, 2 and 7 comprises a pair of spaced wall members defining an insulation compartment, said wall members being in the form of a crock 2 and a metallic sheathing 3.

The sheathing may be formed of seamed and welded light-weight sheet steel. In the embodiment illustrated, the sheathing is in the form of an open ended generally rectangular box with walls 4, 5, 6 and 7 and a back portion 8. These walls are preferably made from a single sheet suitably shaped and welded. The back portion 8 is formed of a separate sheet and is provided with a depending skirt portion 9 which is seamed with exposed edges 10 of the walls and then spot welded to insure a permanent union between the parts. The seam structure illustrated has been found quite satisfactory inasmuch as it is practically air tight. If necessary the seamed joint may be coated with sealing compound on the inside of the sheathing to insure an air tight joint, particularly at the corners where perfect seaming and welding is difficult. Other types of seams may be used if desired or the entire sheathing may be made of a single piece welded construction. The sheathing is preferably air tight.

The outer edges of the sheathing employed in the flush type door construction are preferably rounded off as illustrated at 11 and are formed into inturned flanges 12; which flanges are adapted to engage a breaker strip 13 as more fully hereinafter described. The side walls are notched at the corners of the open end so that when the flanges 12 are formed, they will be separate but contiguous, and may be readily flexed to permit insertion of the breaker strip 13. The flanges 12 are preferably bent inwardly as at 14 so as to be normally urged into contact with the breaker strip 13.

In assembling the cabinet (Figures 1, 2, 7 and 8), insulation material is inserted into position against the walls of the sheathing 3. As illustrated, the side wall pieces are inserted first and then the back piece or pieces. The crock 2 is then placed into position by telescoping it within the sheathing and into contact with the insulation. The breaker strip 13 which is in the form of a closed frame is then positioned on the exposed edges of the crock.

The breaker strip is illustrated in the form of a wooden frame with mitred corners (Figure 7). The strip may be made of any non-conducting material, such as Bakelite, hard rubber or the like and may be molded as a single piece if desired. A sealing recess 15 is provided for reception of the exposed edges of the crock 2. The recess 15 is preferably wider than the thickness of the metal of the crock and is substantially filled with a sealing compound 16 prior to insertion of the edges of the crock.

We prefer to use a plastic sealing compound which adheres firmly to both the metal and to the material of the breaker strip. With a wooden breaker strip and an enameled crock, we have found that a plastic made from a mixture of glyptal and nitrocellulose dissolved in a suitable solvent is satisfactory. An asphaltic plastic or a plastic formed of latex and a filler or any suitable sealing compound may be used if desired.

When the breaker strip is inserted in position as illustrated in Figure 8, the inturned portions 14 of the flanges 12 are compressed slightly and resiliently engage an inner face 17 of the breaker strip. Insulation material 18 lying in the plane parallel to the door opening defined by the breaker strip is then compressed. This may be accomplished by placing the cabinet on a suitable support and applying pressure by means of a hydraulic press to the rear portion 19 of the crock 2, whereby the insulation material disposed between the portions 8 and 19 is compressed. The compression should be sufficient to permit the flanges 14 to snap into contact with portion 20 of the breaker strip. A recess 21 similar to the recess 15 is provided to receive the exposed edges of the flanges 14 and the recess 21 is filled with a suitable sealing compound 22 such as described above.

When the inturned portion 14 snaps into position, the compression is relieved, and the insulation material upon expansion urges the crock away from the sheathing at the zone of compression between the portions 8 and 19, but the relative movement is arrested by the breaker strip 13 engaging the flange 12, thereby urging the inturned portion 14 into the recess 21; the portion 14 of the sheathing being thereby seated in the recess 21 and effectively sealed by the plastic composition 22.

In illustrating the preferred embodiment, we have shown the cabinet insulated throughout with cork board. Cork board made in the usual manner and having a density of about .7 pound per board foot forms a highly satisfactory resilient insulation material for the portion normally under compression. The side walls do not necessarily have to be insulated with a resilient insulation but may be insulated with any of the usual fibrous or metallic insulations or the space may be filled with loose, granular cork, mineral wool or similar insulation materials.

When cork board such as above described in a thickness of 2″ is used as the compressible material, a pressure of approximately 28 pounds per square inch is required to compress the cork board ¼ of an inch, which compression is sufficient to permit the flange 14 to snap into position against the face 20 of the breaker strip. When the pressure is relieved, the crock moves outwardly, as above described, until the flange 14 is seated properly in the sealing recess 21, or about ⅛″ in the embodiment illustrated. It is apparent, therefore, that since the relative movement between the walls 8 and 19 is arrested prior to complete recovery of the insulation material by engagement of the breaker strip 13, the crock 2 is normally under compression and the force transmitted through the breaker strip 13 to the flanges 14 of the sheathing together with the expansive force applied to the back portion 8 places the walls 4, 5, 6 and 7 of the sheathing 3 under tension. It will be noted, that the degree of compression and resultant expansive force may be readily controlled by predetermining the initial distance between the exposed edges of the crock 2 and the flanges 14 before compression or by decreasing or increasing the depth of the recesses 15 or 21.

The force exerted by the insulation material need only be sufficient to maintain the edges of the crock 2 and the sheathing 3 in firm sealing engagement with the breaker strip, but if a light sheet steel sheathing is employed without framing members, it is desirable to apply considerable expansive force in order that the sheathing will be placed under tension sufficient to form a rigid structure.

In place of cork board, any material having the requisite characteristics may be employed. It should preferably be of a heat insulation nature and possess a relatively high degree of elasticity. A suitable substitute for cork board is a relatively dense cork and sponge rubber composition. This composition is not as good a heat insulator as cork board, however.

The crock 2 should be made of material capable of resisting the compressive force without substantial deformation. A crock of 16 gauge vitreous enameled metal is satisfactory for the usual sizes encountered.

In Figure 6 a similar cabinet construction is illustrated, which is assembled from the rear. In this construction the breaker strip 13 (similar numbers are used to designate parts similar to those used in the front construction above described) is placed in position with the flanges 14 of the sheathing 3 positioned in the sealing recess 21. The insulation material is then inserted on the sides of the sheathing and the crock 2 telescoped into position with its exposed edges properly seated in the sealing recess 15. The insulation 18 for the rear portion of the cabinet is then placed in position and the back pan 8 is inserted as shown by the dotted lines. Pressure is applied as by an hydraulic press to compress the insulation material 18 disposed between the pan 8 and the rear wall 19 of the crock 2. This pressure is maintained while the skirt portion 9 of the rear pan 8 is seamed with the side walls of the sheathing 3. Pressure is then released, and the insulation material tends to reexpand urging the edges of the crock and sheathing into firm engagement with the breaker strip 13 and placing the sheathing under tension as above described.

Figure 4:
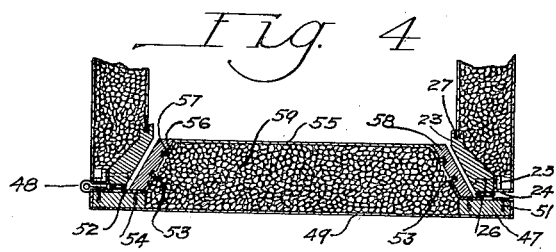
Figure 4 is a detail section partly broken away showing a modified construction with an "outside flush" door.

Figure 4 illustrates a similar construction readily assembled from the rear. In this embodiment an outside flush door is used and a breaker strip 23 of a modified construction is employed. The side walls of the sheathing 3 are bent to form an inturned flange 24 and a suitably tapped metal strip 25 is positioned behind the flange 24 to receive screws 26 which hold the breaker strip 23 in position. The face of the flange 24 which contacts with the breaker strip 23 is preferably coated with the sealing compound above described prior to insertion of the breaker strip, which is secured in proper sealed position when the screws 26 are drawn up. The side wall insulation is placed in position; the crock 2 inserted in a plastic filled sealing recess 27; the rear insulation positioned; the rear sheathing pan inserted and compression applied all as described in connection with Figure 6 above.

Figure 3:
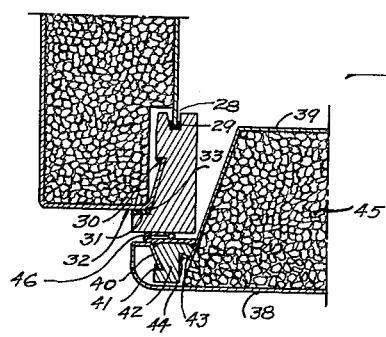
Figure 3 is a detail view showing a modified breaker strip construction and an "outside" door.

We have illustrated in Figure 3 a triple seal breaker strip construction which may be used with either front or rear assembly methods. The crock seats in a groove 28 and is sealed by sealing compound 29 and the sheathing is sealed both at a recess 30 and between an offset shoulder 31 of the breaker strip and a front flat portion 32 of the sheathing; sealing compound being applied to the recess 30 prior to insertion of the breaker strip. Sealing compound 33 is preferably poured into the opening between the shoulder 31 and the surface 32 after assembly. A thermoplastic sealing composition in heated condition or a solvent softened sealing compound may be used.

In both the front and rear assembled constructions above described, the insulation material compressed between the wall members has been of a surface area corresponding to the area of the back portion of the crock. This is not essential. For some purposes, particularly when cheaper insulation materials must be used, only a relatively small amount of compressible material need be employed provided it is properly positioned so as to exert the necessary expansive force upon the walls. In Figure 9, for example, we have shown a refrigerator assembly prior to the application of pressure and in which substantially non-resilient fibrous insulation is used for the main portion of the cabinet. In this embodiment a ring or frame of cork 33 is positioned to engage the back 19 of the crock 2 adjacent the outer peripheral edge thereof in order that expansive force will be applied over the side walls or skirt portion of the crock.

The frame of cork 33 has been illustrated as slightly thicker than the fibrous insulation 34. The difference in thickness is preferably equal to the reduction in thickness of the cork 33 upon compression. It is not essential that this thickness differential be observed, but it is desirable in order to avoid the loss of insulating efficiency attending compression of fibrous insulation.

Figure 10 illustrates a modified construction wherein springs 35 mounted in non-conducting cups 36 are utilized to urge the wall members 8 and 19 apart. Helical compression springs are illustrated, but it will be understood that other springs of various types may be substituted if desired. The springs 35 are preferably positioned at the four corners of the back wall 19 of the crock 2 and the cups 36 may be adhesively secured in position to permit ready assembly. A loose cork or fibrous filling material 37 serves as an insulating layer. If desired, however, sheet or block insulation may be used if it is shaped to fit about the spring and cup members.

A metallic insulation having structural characteristics may be shaped to form a biased spacing means if desired, or flat spring members, with non-structural insulation, may be used.

The door construction illustrated in Figure 3 is of the snap type and embodies an outer wall member 38 and an inner wall member 39 in the form of an enameled metal pan. The outer wall member 38 has an inturned flange 40 which is adapted to engage a sealing recess 41 of a breaker strip 42. The inner wall member 39 is provided with a similar flange 43 which contacts with the breaker strip 42 at a recess 44. In assembly, insulation material 45, which preferably is in the form of cork board or other resilient insulation material, is placed in position against the wall member 38. The inner wall member 39 is then positioned over the insulation material with the breaker strip 42 engaging the flange 43 of the inner wall member 39. Pressure is applied to compress the cork board and the breaker strip is forced downwardly until the flange 40 is in proper engagement with the sealing recess 41. As described in the cabinet construction, sealing compound is placed in the recesses prior to insertion of the wall members. When compression of the cork board is released the wall members 38 and 39 are normally urged away from each other by the expansive action of the resilient insulation material and are thereby urged into firm engagement with the breaker strip. A sealing gasket 46 is positioned to engage the breaker strip 31 of the cabinet whereby the entire refrigerated compartment is sealed.

Figure 4 illustrates a modified snap door construction in which a wooden supporting frame 47 is used to stiffen the structure and to receive fastening devices for securing the door to hinges 48. In this construction, an outer door casing or wall member 49 is provided with an inturned flange 50 through which pass screws 51 which hold the frame member 47 and flange 50 in position. A metallic supporting member 52 provided with a breaker strip engaging flange 53 is secured to the frame 47 by screws 54. The inner wall is in the form of a pan 55 also having a flange 56 which is adapted to engage the shoulder of a recess 57 formed in a breaker strip 58. In this construction insulation material 59 is placed in the opening defined by the supporting frame 47. The breaker strip 58 is then placed in position with respect to the breaker strip engaging flange 52, after which pressure is applied between the wall members 55 and 49 until the flanges 56 engage the breaker strip 58 in the recesses 57. When pressure is relieved the wall members are urged away from each other and the breaker strip limits the relative movement between the wall members. In place of flanges 53 and 56 the members may be formed with outwardly extending tangs to engage the breaker strips which are formed with channels or recesses as required. Sealing compound is employed to form an airtight construction.

Figure 5:
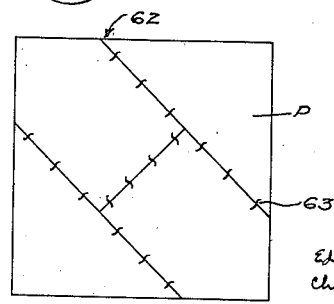
Figure 5 is a plan view showing the wood support for the door illustrated in Figures 1 and 2.

The door construction illustrated in Figures 1 and 2 is of the conventional type insofar as the positioning of the insulation material is concerned; that is, the insulation lies in the insulating chamber without being under compression. An outer casing 60 is formed with an inturned flange 61 and a stiffening support 62 is placed therein. Since the casing is formed with an inturned flange, it is impossible to insert the supporting member 62 as a single piece. In Figure 5 we have illustrated a supporting or stiffening member which is sawn into four pieces P to permit ready insertion. If desired, a supporting frame such as illustrated at 47 in Figure 4 may be substituted for the stiffening member 62. After insertion the pieces are joined by means of corrugated metallic clinching members 63. An inner pan or wall member 64 is secured over insulation material 65 and held in place by means of screws 66 passing into the supporting member 62. Hinges 67 are also secured to the supporting member 62 and to tapped metal blocks 68, suitably positioned against the flange 12 of the outer wall member of the cabinet 3. A sealing gasket 69 is provided and engages a gasket engaging projection or bead 70 on the breaker strip 13, (Figure 8).

In place of the door illustrated in Figures 1 and 2, a complete snap construction for both the cabinet and door may be used, in which event a snap type door constructed similar to Figures 3 or 4, but of the inside flush type, will be employed.

If the refrigerator is to be of the ice type, a drain 71 should be provided. The drain should be properly seated and sealed to prevent air leakage into the insulation compartment. The drain should preferably be of non-metallic material to prevent heat conduction from the outer sheathing to the inner crock.

If the refrigerator be of the mechanical type, a shouldered aperture suitable for passage of pipes, tubes or the like from a cooling unit may be provided as required. If the cooling unit is to rest on the top of the cabinet, the opening into the cabinet may be provided with a sealing breaker strip similar to that illustrated and described in connection with the door construction shown in Figure 4.

In Figure 1 the bottom of the crock 2 is illustrated as contoured at 72 to meet the breaker strip flush at its inner edge so there is no abrupt projection to interfere with cleaning. If desired, the hollow portion thus formed may be filled with plastic or insulation material 73 prior to assembly.

It will be noted that in all of the constructions illustrated there is no metal to metal contact between one outer wall member (sheathing or door casing) and the other or inner wall member (crock or door insulation pan). This is desirable since it prevents through conduction from the outer wall member which is at a temperature approaching room temperature to the inner wall member which is relatively colder since it defines the refrigeration compartment.

Our cabinet is light in weight and structurally strong. It is efficiently insulated and this insulating efficiency is permanent since the insulation compartment is sealed and precipitation of moisture in the insulation is prevented. The permanence of sealing is insured by reason of the metallic wall members being constantly thrust into sealing engagement with a breaker strip. This sealing is particularly effective when a breaker strip with a plastic filled recess is used.

Cabinets made according to our invention are readily assembled and are admirably adapted to line production methods since there are few parts to be assembled. In addition to this, the disadvantages of a frame construction are obviated. The frame members usually employed absorb considerable moisture and permit air to enter the insulation compartment, since, with a framed construction, such as commonly used, it is impossible to obtain an effective seal. In our preferred cabinet, there are but two joints to be closed upon assembly and these are readily and effectively sealed by placing a plastic composition in sealing recesses of a breaker strip and snapping the strip into sealed position with respect to the outer and inner wall members. When mechanical fastening devices are employed, it should be borne in mind that utmost care must be exercised to prevent leaking. Even an opening of very small size will permit the ingress of moisture-laden air which will soon decrease the insulating efficiency of the box.

By the use of cork board or other structural insulation throughout the cabinet and utilization of the inherent resiliency of the insulation to tense the sheathing, it is possible to make a light weight cabinet without framing members which is structurally very rigid. When loose insulation is employed, it is desirable to use a slightly heavier gauge metal for the sheathing. This will insure as rigid a box as that resulting when structural insulation is used.

We have illustrated and described our invention in connection with an insulated structure in the form of a refrigerator cabinet. It will be understood, however, that other insulated structures, such for example as insulated cabinets, are contemplated by our invention.

While we have illustrated and described certain preferred embodiments of our invention it will be understood that the invention may be otherwise embodied and practiced within the scope of the following claims.

We claim:

1. In an insulated structure, a pair of spaced wall members, means having the property of sustained recovery after substantial compression disposed between said wall members under substantial compression and normally urging said members away from each other at the zone of compression and a non-conducting strip cooperating with said members, closing the opening between the edges of said members, and limiting the relative movement between said members which the compressed means normally urges.

2. In an insulated structure, a pair of spaced wall members, heat insulation disposed between said members, a portion at least of said insulation having the property of sustained recovery after substantial compression, being under substantial compression and normally tending to expand and urge said wall members away from each other at the zone of compression, and a breaker strip of non-conducting material closing the opening between the edges of said members and serving to hold said wall members in predetermined spaced relationship by virtue of said expansion, the zone of contact between said breaker strip and said wall members being sealed with a plastic compound.

3. In a refrigerator, an open ended crock defining a refrigeration compartment, an open ended metallic sheathing member positioned about said crock to form an insulation compartment, a breaker strip of non-conducting material joining said crock and said sheathing and defining a door opening, heat insulation material having the property of sustained recovery after substantial compression disposed within said compartment, a portion at least of said insulation disposed in a plane parallel to the plane of said door opening being under substantial compression and normally urging said crock and said sheathing away from each other at the zone of compression, said crock being under substantial compression and said sheathing being under tension whereby a rigid structure is obtained.

4. In a refrigerator, an open ended crock having side walls and a back portion and defining a refrigeration compartment, an open ended metallic sheathing positioned about said crock, portions at least of the sheathing lying in substantially the same planes as the planes of the walls of said crock with the edges of said walls and said sheathing in contact with a breaker strip, insulation material disposed between said crock and said sheathing, a portion at least of said insulation having the property of sustained recovery after substantial compression and being under substantial compression, said crock being normally under compression and said sheathing being normally under tension.

5. In a refrigerator, an inner crock having a rear portion and side walls, an outer metallic sheathing disposed in spaced relationship with respect to said crock and defining an insulation compartment, resilient insulation having the property of sustained recovery after substantial compression disposed between the rear portion of said crock and said sheathing and contacting with said rear portion substantially in line with said side walls, the surface area of said resilient insulation material contacting with said rear portion being less than the entire surface area of said rear portion, said insulation being under substantial compression and urging said crock and said sheathing into engagement with a non-conducting sealing breaker strip which closes the opening between the edges of the side walls of the crock and shell members.

6. The combination with a refrigerator having a pair of spaced wall members with structural insulation material having the property of sustained recovery after substantial compression disposed therebetween, a portion at least of said insulation being under substantial compression and normally tending to reexpand at the zone of compression, of a non-conducting breaker strip extending between said wall members and having a groove extending longitudinally of substantally the entire strip, plastic sealing composition disposed within said groove and adapted to seal the edge of one of said wall members, a similar groove provided in said breaker strip and extending in a plane substantially parallel to the plane of said first mentioned groove and adapted to receive the edge of the other wall member.

7. In the method of making an insulated structure having spaced wall members, means having the property of sustained recovery after substantial compression therebetween biased to move said wall members with respect to each other, and a breaker strip limiting the relative movement of said wall which the biased means normally urges, the steps consisting in applying a straining stress to the biased means to an extent at least as great as that necessary to produce the bias required in the assembled structure, and transferring said straining stress to the wall members through said breaker strip.

8. In the method of making an insulated structure having a pair of wall members, heat insulation having the property of sustained recovery after substantial compression disposed between said members and a breaker strip serving to space said wall members, the steps consisting in applying sufficient pressure to move said wall members toward each other thereby substantially compressing a portion at least of said insulation disposed therebetween, releasing said pressure and locking said structure to final dimensions prior to complete recovery of said insulation.

9. In the method of making a refrigerator having crock and sheathing members with means having the property of sustained recovery after substantial compression therebetween biased to move said crock and sheathing with respect to each other, the steps consisting in placing a breaker strip into engagement with one of said members, applying a straining stress to the biased means to cause relative movement between said members sufficient to permit sealing engagement of the other of said members with said breaker strip, and thereafter releasing said straining stress and locking said biased means under substantial compression.

10. In an insulated structure, a pair of spaced wall members, heat insulation, having the property of sustained recovery after substantial compression, substantially compressed and not completely recovered, disposed between said members, said insulation exerting a force against said wall members greater than that required to overcome the weight of said wall members and a breaker strip joining said wall members and limiting the relative movement between said wall members urged by the insulation in its attempted recovery.

11. In the method of making an insulated cabinet, the steps consisting in positioning insulation material having the property of sustained recovery after substantial compression between an inner shell and an outer sheathing, positioning a breaker strip in engagement with said shell, applying pressure to the insulation material disposed between said shell and sheathing to substantially compress the same and to impart relative movement between said shell and sheathing in an amount sufficient to permit sealing engagement of said sheathing with said breaker strip, releasing said pressure and permitting said shell and sheathing to move away from each other at the zone of compression to urge shell and sheathing into firm sealing engagement with the breaker strip prior to complete recovery of said insulation material.

12. In the method of making an insulated cabinet, the steps consisting in positioning an inner crock within a metallic sheathing with resilient insulation material having the property of sustained recovery after substantial compression disposed between the wall members formed thereby, said crock being provided with an edge facing in the direction of an edge on the sheathing, positioning a breaker strip having a pair of sealing grooves with the edge of said crock lying in one of said grooves, applying pressure to said wall members to cause relative movement therebetween and substantial recoverable compression of said insulation material, positioning the edge of the sheathing in the other sealing groove of the breaker strip, and releasing the application of pressure to said wall members and permitting partial recovery of said insulation material to urge said edges into sealing engagement with said breaker strip.

13. In an insulated structure, a pair of spaced wall members, one of said spaced wall members having a flexible flange thereon, a non-conducting strip cooperating with said members and having a sealing recess adapted to receive said flexible flange, and resilient means having the property of sustained recovery after substantial compression disposed between said wall members under substantial compression and normally urging said members away from each other at the zone of compression, said non-conducting strip closing the opening between the edges of said wall members and limiting the relative movement between said members which the compressed means normally urges.

14. The combination with a refrigerator having a pair of spaced wall members with heat insulation having the property of sustained recovery after substantial compression disposed therebetween under substantial compression and normally urging said members away from each other at the zone of compression, of a nonconducting breaker strip extending between said wall members and having a pair of longitudinally extending sealing recesses receiving the edges of said wall members and closing the opening therebetween and limiting the relative movement between said members which the compressed means normally urges.

15. The combination with an insulated structure having a pair of spaced wall members with means having the property of sustained recovery after substantial compression disposed therebetween under substantial compression and normally urging said wall members away from each other at the zone of compression, of a breaker strip for joining said members and closing the opening between the edges thereof and limiting the relative movement between said members which the compressed means normally urges comprising a closed frame of non-conducting material having a pair of longitudinally extending sealing recesses adapted to receive the edges of said wall members.

16. The combination with an insulated structure having a pair of spaced wall members with means having the property of sustained recovery after substantial compression disposed therebetween under substantial compression and normally urging said wall members away from each other at the zone of compression, of a breaker strip for joining said members and closing the opening between the edges thereof and limiting the relative movement between said members which the compressed means normally urges comprising a closed frame of nonconducting material having a pair of longitudinally extending sealing recesses adapted to receive the edges of said wall members, said recesses being of a width greater than the thickness of the wall members they are to receive and said recesses having sealing means disposed therein.

17. In an insulated structure, a pair of spaced wall members, insulation material disposed between said wall members, spring means also disposed between said wall members under compression and normally urging said members away from each other at the zone of compression, and a nonconducting strip cooperating with said members, closing the opening between the edges thereof and limiting the relative movement between said members which the spring means normally urges.

EDMUND CLAXTON.
CHARLES C. SCHRADER.
HOWARD G. SWARR.